United States Patent
Russell

(10) Patent No.: US 7,149,469 B2
(45) Date of Patent: Dec. 12, 2006

(54) METHOD AND SYSTEM FOR RECEIVING AUDIO BROADCASTS VIA A PHONE

(76) Inventor: Larry Russell, 200 Martinique Ave., Tiburon, CA (US) 94920

( * ) Notice: Subject to any disclaimer, the term of this patent is extended or adjusted under 35 U.S.C. 154(b) by 274 days.

(21) Appl. No.: 10/022,186

(22) Filed: Dec. 11, 2001

(65) Prior Publication Data
US 2002/0081968 A1 Jun. 27, 2002

Related U.S. Application Data

(60) Provisional application No. 60/257,505, filed on Dec. 21, 2000.

(51) Int. Cl.
- H04H 1/00 (2006.01)
- H04B 7/00 (2006.01)
- H04B 1/06 (2006.01)

(52) U.S. Cl. .................. 455/3.01; 455/3.05; 455/66.1; 455/344

(58) Field of Classification Search ............... 455/3.01, 455/3.02, 3.03, 3.04, 3.05, 3.06, 66.1, 344, 455/158.2, 158.4, 158.5, 414.3, 414.4, 414.1, 455/186.1, 435.1; 348/13; 379/101.01
See application file for complete search history.

(56) References Cited

U.S. PATENT DOCUMENTS

| | | | | |
|---|---|---|---|---|
| 5,052,048 A | * | 9/1991 | Heinrich | 455/66.1 |
| 5,594,779 A | * | 1/1997 | Goodman | 455/3.04 |
| 5,812,937 A | * | 9/1998 | Takahisa et al. | 455/66.1 |
| 5,852,610 A | * | 12/1998 | Olaniyan | 370/486 |
| 5,991,637 A | * | 11/1999 | Mack et al. | 455/563 |
| 6,236,832 B1 | * | 5/2001 | Ito | 455/3.06 |
| 6,331,669 B1 | * | 12/2001 | Lee et al. | 84/609 |
| 6,507,727 B1 | * | 1/2003 | Henrick | 455/3.06 |
| 6,529,742 B1 | * | 3/2003 | Yang | 455/556.1 |
| 6,539,210 B1 | * | 3/2003 | Heredia et al. | 455/154.1 |
| 6,577,849 B1 | * | 6/2003 | Eaton et al. | 455/3.01 |
| 6,643,495 B1 | * | 11/2003 | Gallery et al. | 455/3.06 |
| 6,658,231 B1 | * | 12/2003 | Nakatsuyama | 455/3.06 |
| 6,658,267 B1 | * | 12/2003 | Baranowski et al. | 455/344 |
| 6,804,510 B1 | * | 10/2004 | Bates et al. | 455/414.4 |

* cited by examiner

*Primary Examiner*—Tilahun Gesesse
(74) *Attorney, Agent, or Firm*—Law Offices Of K. W. Wang; Karry W. Wang, Esq.

(57) ABSTRACT

A method and system for providing radio, TV audio, and other broadcasts over a telephone. The preferred method allows a listener to telephonically access an automated system capable of connecting to a plurality of broadcasting stations, permits the listener to select a desired station, and transmits broadcast of the desired station via the telephone.

14 Claims, 2 Drawing Sheets

METHOD AND SYSTEM FOR RECEIVING AUDIO BROADCASTS VIA A PHONE

CROSS-REFERENCE TO RELATED APPLICATIONS

This application claims the benefit of U.S. Provisional Application No. 60/257,505 filed Dec. 21, 2000, the contents of which are incorporated herein by reference.

FIELD OF THE INVENTION

This invention relates generally to systems and methods for receiving radio and other audio broadcasts and, more specifically, to systems and methods for receiving radio and other audio broadcasts on a telephone.

BACKGROUND OF THE INVENTION

Over the past ten years, the cellular phone has evolved from a device used only by an elite segment of the population to a device used by the masses. One research report indicates that the number of cellular phone subscribers in the United States alone has increased from approximately 3.5 million at the start of 1990 to 60 million in 1998 to over 100 million in year 2000. (The Cellular Telecommunications Industry Association, *Semi-Annual Wireless Industry Survey*, Mar. 2001. According to another report; 38% of consumers say that they have a lot (16%) or some (22%) interest in having their cellular phone replace their home telephone, forming primary and secondary markets for "cutting the cord." (P. D. Hart Research Associates, *The Wireless Marketplace* in 2000, Feb. 2000). In addition, research also shows that cellular phone subscribers are looking forward to wireless data services to include more options, such as wireless e-mail, text messaging and Internet access. (Id.)

More and more services are becoming available for cellular phone, and newer, smaller, more sophisticated cellular phones continue to penetrate the marketplace. At the same time, however, very few people carry portable radios or televisions. This is probably because carrying a typical portable radio or television is inconvenient due to their large and bulky size. Therefore, it would be advantageous to a listener to be able to use wireless phones to obtain continued access to radio, television audio, or other public audio broadcasts.

SUMMARY OF THE INVENTION

The present invention relates to methods and systems for receiving radio, TV audio, and other broadcasts on a telephone. In the preferred embodiment, a caller uses a telephone, such as a landline telephone, a wireless phone or a cellular phone, to access an automated telephone broadcast system capable of connecting to a plurality of broadcasting stations. The system allows the caller to select a broadcasting station based on the station's call letters, band and frequency if the station is a radio station, channel number if the station is a TV station, or the caller's local area or zip code. The broadcast is transmitted via the telephone once the selection is verified as valid and registered with the system.

An automatic telephone broadcast system in accordance with the present invention, therefore, preferably comprises a means for connecting to a plurality of broadcast stations, a means for a caller to be able to telephonically access the system, a menu of different broadcasting options such as radio and TV broadcasting, a means for the caller to request to receive the broadcast of the station, a means for verifying the caller's request, and a means for transmitting the broadcast of the station via the telephone.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE INVENTION

Figure 1:
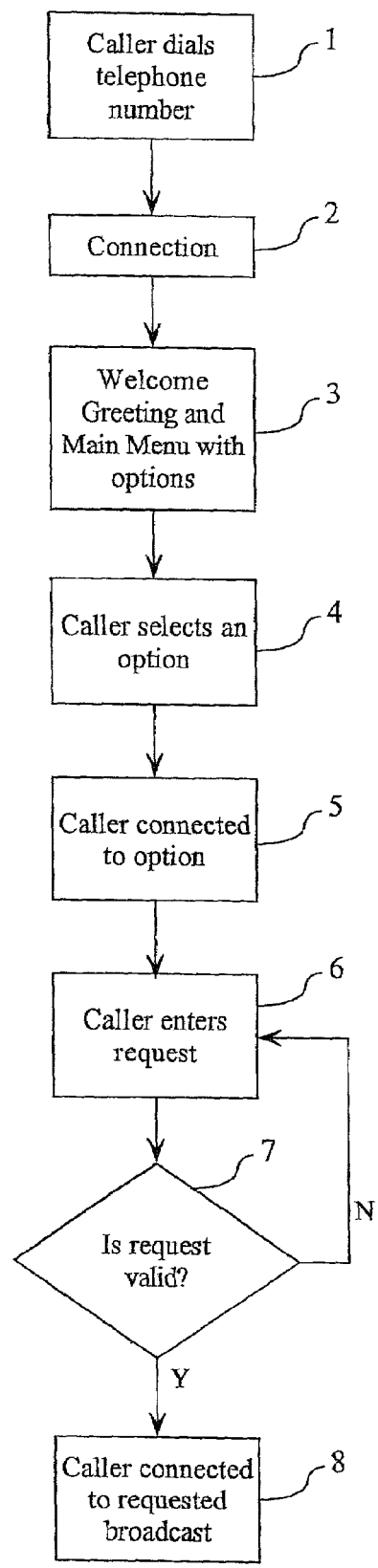
FIG. 1 is a flowchart illustrating the general schematic of the invention.

FIG. 1 illustrates the general schematic of the preferred embodiment in accordance with the present invention. An automated telephone broadcast system capable of connecting to radio and other audio broadcast stations, such as television audio broadcast, and transmitting the broadcasts via telephones and wireless phones is provided. The methodology for connecting a telephone caller to the broadcast stations comprises creating a connection between the telephone and the broadcast source and connecting the broadcast signal via a dial up phone network that allows for a telephone switch to direct a call to the appropriate broadcast source. Therefore, a connection telephone number is provided for both landline and wireless phone users to dial into the system to receive radio and other audio broadcasts. This telephone number may be a local number, an 800 or similar telephone number that is free of charge, or a number with a 900 area code or similar charge-per-unit-time telephone number, as discussed in further detail below. After the telephone number is dialed (block 1) and the connection to the system is established (block 2), the caller reaches the Welcome Greeting and the Main Menu prompt (block 3), which instructs the caller how to use the system and offers various broadcast options. The caller chooses an option (block 4) by pressing the corresponding number on the phone keypad, and is connected to the selected option (block 5). The caller is then asked to enter a request for the desired broadcast on the phone keypad. After the request is entered (block 6), the system verifies the validity of the request (block 7). If the request is invalid (i.e., if the request does not exist on the system), the caller is asked to enter the request again or another request. If the request is a valid one, the caller is connected to the requested broadcast (block 8).

Therefore, a telephone broadcast system in accordance with the present invention preferably comprises a means for connecting to a plurality of broadcast stations, a means for a caller to be able to telephonically access the system, a menu of different broadcasting options such as radio and TV broadcasting, a means for the caller to request to receive the broadcast of the station, a means for verifying the caller's request, and a means for transmitting the broadcast of the station via the telephone. The system is preferably automated.

Figure 2:
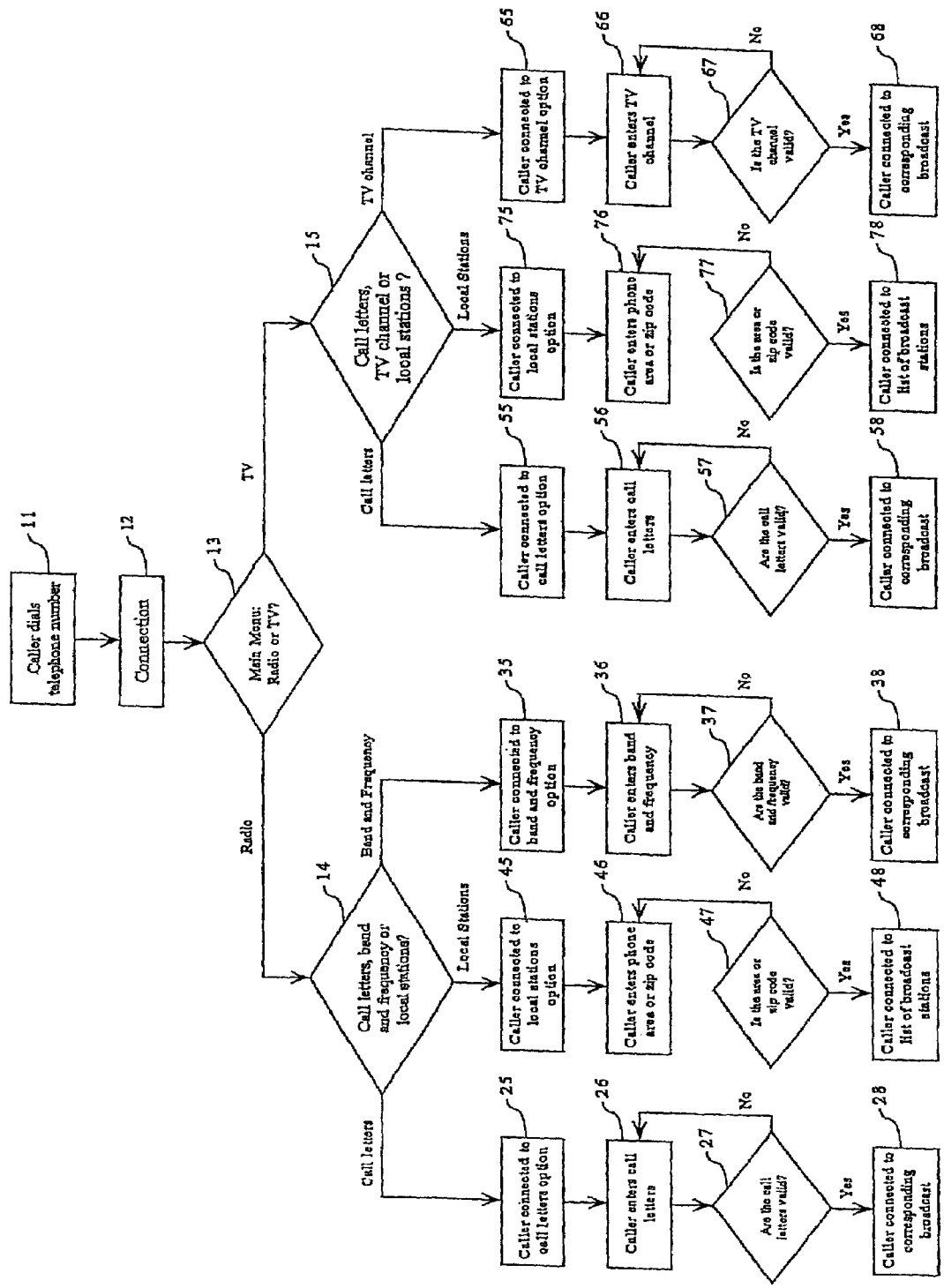
FIG. 2 is a flowchart of a preferred embodiment of the invention.

Referring to FIG. 2, a preferred embodiment of the present invention is shown. At blocks 11–13, the caller dials the provided telephone number to connect to the automated broadcast system, and reaches the Main Menu when the connection is established. The Main Menu comprises a radio broadcast submenu (block 14) and a TV broadcast submenu (block 15). A preferred Greeting and Main Menu prompt comprises the following:

Hello, and welcome to the radio telephone. This system allows you to listen to radio or TV audio broadcast via your telephone or wireless phone. You have reached the Main Menu. You may press the star key at any time during this call to return to the Main Menu. You may end this call at any time by pressing 9 on your telephone keypad or simply hang up. For radio broadcasts, press 1 now. For TV audio broadcasts, press 2 now.

If 1 is selected, the caller is connected to the radio broadcast submenu (block 14), which comprises three options. A preferred radio broadcast submenu prompt comprises the following:

You have reached the radio broadcast system. If you know the call letters of the radio station you'd like to listen to, press 1 now. If you know the band and frequency of the radio station you'd like to listen to, press 2 now. Press 3 to access your local radio stations.

Therefore, if the caller selects option 1, he or she is connected to the call letters option (block 25) and asked to enter the call letters of the desired broadcast station. After the call letters are entered via the phone keypad (block 26), the system verifies the validity of the call letters (block 27). If the call letters entered do not represent one of the radio stations registered with the system, the caller is asked to enter the call letters again or enter another set of call letters. If the call letters entered match one of the call letter sets stored in the system, the system connects the caller to the corresponding radio station (block 28). Because each numbered key on a telephone keypad is normally used to designate three or more letters, it is possible that the caller's input would match more than one set of call letters registered with the system (e.g., 5234 can be used to designate KADG or KBEH). In that case, the caller is asked to select the intended set of call letters from a list of call letter sets triggered by the caller's input. The caller can then listen to the requested radio broadcast via her telephone or wireless phone. To further assist the user, the four letter radio station identifiers are preferably coded in on a web site with an address such as www.cellradio.am or www.cellradio.fm.com.

Similarly, if the caller selects option 2, she is connected to the band and frequency option (block 35) and asked to provide the radio band (e.g., 1 for FM, and 2 for AM) and the frequency number. At block 36, the caller enters the band and frequency number. The system verifies the input (block 37) and, if the band and frequency number entered are not registered with the system, the caller is asked to enter the request again or another request. If the input is verified as one that is registered with the system, the caller is connected to the corresponding radio station (block 38).

If option 3 is selected, the caller is connected to local stations option at block 45 and is asked to provide a local area code or zip code. After the caller enters a local area code or zip code (block 46), the system verifies the area or zip code (block 47), and provides the caller a list of local radio stations within the area code or zip code area (block 48). If the area or zip code entered does not match one that is registered with the system, the caller is brought back to block 46 and is asked to enter the code again. After the caller is connected to the list of local radio stations, she may then choose a radio station from the list by pressing the corresponding keypad number.

With further reference to FIG. 2 and the preferred Main Menu prompt discussed above (block 13), if the caller presses 2 on the phone keypad after the Main Menu prompt, the caller is connected to the TV broadcast submenu at block 15, which comprises three options. A preferred TV broadcast submenu prompt comprises the following:

You have reached the TV audio broadcasting system. If you know the call letters of the TV station you'd like to listen to, press 1 now. If you know the channel number of the TV station you'd like to listen to, press 2 now. Press 3 to access your local TV stations.

Similar to the radio submenu options, if the caller presses 1 on the phone keypad, they are connected to the call letters option at block 55. The caller is asked to enter the call letters of the desired TV station by pressing the corresponding numbers on the keypad. After the call letters are entered (block 56), the system verifies the call letters (block 57). If the call letters do not match those stored in the system, the caller is brought back to block 56 and is asked to enter the call letters again. If the call letters are found in the system, the caller is connected to the corresponding TV audio broadcast (block 58). If the caller's input triggers more than one set of call letters registered with the system due to the multiple letter designation per numbered key on the telephone keypad (e.g., 234 can mean ADG or BEH), the caller is asked to select the intended set of call letters from a list of call letter sets triggered by the caller's input. To further assist the user, the TV station call letters or identifiers are preferably coded in on a web site with an address such as www.cellradio.tv.

If option 2 is selected, the caller is connected to the TV channel option at block 65. The caller is asked to enter the TV channel on the keypad. After the caller enters the TV channel (block 66), the system verifies the input (block 67). If the TV channel entered is not registered with the system, the caller is brought back to block 66 and asked to enter another TV channel. If the TV channel entered is found in the system, the caller is connected to the corresponding TV audio broadcast (block 68).

If the caller chooses option 3, she is connected to the local station option at block 75. The caller is asked to provide a local area or zip code. After the caller enters the local area or zip code (block 76), the system then confirms the local area or zip code entered (block 77). If the area or zip code does not match any entry registered in the system, the system asks the caller to enter another area or zip code. If the area or zip code entered is confirmed, the system provides a list of local TV audio broadcast stations to the caller (block 78). The caller may then choose a station from the list by pressing the corresponding keypad on the telephone and connect to the station selected.

It is understood that the Main Menu may include one or more submenus, and a submenu may include one or more options in accordance with the principles of the invention. It is also understood that the system may not include any submenu or may include multiple levels of menus.

Preferably, an 800, 888, or similar accessible telephone number, or a local telephone number is used for a caller to connect to the automated telephone broadcast system. In the latter case, more than one broadcast system may be made available with corresponding local telephone numbers, and the caller is directed to the closest local broadcast system. For example, if a caller from San Francisco dials into a broadcast system located in New York, she may be provided with a telephone number to be connected to an automated telephone broadcast system located in San Francisco and may be asked to call the San Francisco telephone number instead. The cost for maintaining the broadcast system is preferably recovered from radio or TV stations or other audio broadcast entities with support from the cellular or related long distance phone carriers. That is, a registration fee is preferably charged for a radio or TV station to be listed on the broadcast system, and the cellular or long distance carrier may subsidize the broadcast system to add usage time on their systems. Alternatively, an advertisement may be included in the Welcome Greeting to derive enough revenue to cover the maintenance cost. In addition, options to purchase the advertised products or services may be made available to callers.

Alternatively, a 900 or similar charge-per-unit-time telephone number is used for connecting to the automated telephone broadcast system. In addition, an 800 or similar free-of-charge telephone number may be used in conjunction with a membership fee or credit card charge. More specifically, a caller may purchase a personal identification number (PIN) activated for a month or any other specified time period to gain access to the broadcast system, using the 800 number, or the caller may use a credit card to purchase connection time to the system after dialing the 800 number.

Although the invention herein has been described with reference to particular embodiments, it is to be understood that the embodiments are merely illustrative of the principles and application of the present invention. It is therefore to be understood that various modifications may be made to the above mentioned embodiments and that other arrangements may be devised without departing from the spirit and scope of the present invention.

I claim:

1. A method of providing a broadcast of a station over a telephone, comprising the steps of:
    placing a call from the telephone;
    telephonically accessing a system capable of connecting to a plurality of broadcast stations registered with the system;
    requesting to receive the broadcast of the station;
    connecting the call to the station; and
    transmitting the broadcast of the station via the telephone.

2. The method of claim 1, wherein the station is a member selected from the group consisting of radio stations and TV audio broadcasting stations.

3. The method of claim 2, further comprising the step of providing a menu of identification options for identifying the station, wherein the requesting step comprises the steps of:
    selecting an identification option; and
    entering the identification of the station under the identification option.

4. The method of claim 3, further comprising the step of verifying the identification entered.

5. The method of claim 4, wherein the station is a radio station and the identification is a member selected from the group consisting of call letters, band and frequency, area code, and zip code.

6. The method of claim 4, wherein the station is a TV audio broadcasting station and the identification parameter is a member selected from the group consisting of call letters, TV channel, area code, and zip code.

7. The method of claim 4, wherein the telephone is a cellular telephone.

8. A method of providing a broadcast of a station over a telephone, comprising the steps of:
    placing a call from the telephone;
    telephonically accessing a system capable of connecting to a plurality of broadcast stations registered with the system;
    selecting an option from a menu of identification options for identifying the station;
    verifying the identification of the station;
    connecting the call to the station; and
    transmitting the broadcast of the station via the telephone.

9. The method of claim 8, wherein the telephone is a cellular telephone.

10. A system of providing a broadcast of a station over a telephone, comprising:
    a means for connecting to a plurality of broadcast stations registered with the system;
    a means for a listener to access the system by placing a call from the telephone;
    a means for the listener to request to receive the broadcast of the station; and
    a means for connecting the call to the station and transmitting the broadcast of the station via the telephone.

11. The system of claim 10, wherein the means for connecting to a plurality of broadcast stations enables the system to be connected to a plurality of radio and TV audio broadcasting stations.

12. The system of claim 11, wherein the means for the listener to request to receive the broadcast of the station comprises:
    a menu of identification options for identifying the station;
    a means for the listener to select an identification option;
    a means for the listener to enter a station identification under the identification option selected; and
    a means for the system to accept the station identification entered.

13. The system of claim 12, wherein the means for the system to accept the station identification entered comprises a means for verifying the station identification entered.

14. The method of claim 10, wherein the telephone is a cellular telephone.

* * * * *